(12) United States Patent
Turunen et al.

(10) Patent No.: US 11,339,536 B2
(45) Date of Patent: May 24, 2022

(54) FIBROUS WEB MANUFACTURING ROLL WITH COVER HAVING FUNCTIONAL LAYER WITH NANOCELLULOSE MATERIAL

(71) Applicant: Valmet Technologies Oy, Espoo (FI)

(72) Inventors: Jani Turunen, Lievestuore (FI); Marko Kovanen, Lievestuore (FI); Heikki Kettunen, Espoo (FI)

(73) Assignee: Valmet Technologies Oy, Espoo (FI)

( * ) Notice: Subject to any disclaimer, the term of this patent is extended or adjusted under 35 U.S.C. 154(b) by 0 days.

(21) Appl. No.: 16/977,066

(22) PCT Filed: Mar. 1, 2019

(86) PCT No.: PCT/FI2019/050164
§ 371 (c)(1),
(2) Date: Aug. 31, 2020

(87) PCT Pub. No.: WO2019/166699
PCT Pub. Date: Sep. 6, 2019

(65) Prior Publication Data
US 2020/0407917 A1    Dec. 31, 2020

(30) Foreign Application Priority Data

Mar. 1, 2018   (FI) .................................. 20185201

(51) Int. Cl.
*D21G 1/02*    (2006.01)
*B65H 27/00*   (2006.01)
(Continued)

(52) U.S. Cl.
CPC ............. *D21G 1/02* (2013.01); *B65H 27/00* (2013.01); *D21C 9/007* (2013.01); *D21H 11/18* (2013.01);
(Continued)

(58) Field of Classification Search
CPC ........ C08L 1/02; A61L 2400/12; C01B 32/16; D21G 1/02; B65H 27/00; B65H 2401/112;
(Continued)

(56) References Cited

U.S. PATENT DOCUMENTS

| 8,105,682 B2 * | 1/2012 | Sun ........................... D01F 6/46 |
| | | 428/292.1 |
| 8,591,952 B2 * | 11/2013 | Stellacci .............. B01J 20/3433 |
| | | 424/489 |

(Continued)

FOREIGN PATENT DOCUMENTS

WO          0050691 A1    8/2000

OTHER PUBLICATIONS

International Search Report for PCT/FI2019/050164 dated May 22, 2019.

(Continued)

*Primary Examiner* — Jason L Vaughan
(74) *Attorney, Agent, or Firm* — Stiennon & Stiennon

(57) ABSTRACT

The invention relates to a roll for use in a manufacture of a fibrous web, which comprises cellulosic fibers. The roll comprises a roll body with a cylindrical surface, and a roll cover, which is arranged to cover the cylindrical surface of the roll body. The cover has a functional layer, which has a polymer matrix and reinforcing material in the form of functional particles and/or functional fibers embedded in the polymer matrix. The functional particles and/or functional fibers has nanocellulose material. The invention relates also to the use of the roll.

19 Claims, 1 Drawing Sheet

(51) Int. Cl.
*D21C 9/00* (2006.01)
*D21H 11/18* (2006.01)
*D21H 23/58* (2006.01)
*B82Y 30/00* (2011.01)

(52) U.S. Cl.
CPC ....... *D21H 23/58* (2013.01); *B65H 2401/112* (2013.01); *B82Y 30/00* (2013.01)

(58) Field of Classification Search
CPC ........ D21C 9/007; D21H 11/18; D21H 23/58; B82Y 30/00
See application file for complete search history.

(56) References Cited

U.S. PATENT DOCUMENTS

| | | | | |
|---|---|---|---|---|
| 9,534,320 | B2* | 1/2017 | Laukkanen | C08J 5/045 |
| 9,797,075 | B2* | 10/2017 | Korley | D06M 15/55 |
| 10,132,005 | B2* | 11/2018 | Soderberg | D01D 5/14 |
| 10,899,899 | B2* | 1/2021 | Banzashi | D21H 11/18 |
| 2003/0096063 | A1 | 5/2003 | Withers et al. | |
| 2009/0152773 | A1* | 6/2009 | Barinov | D01D 5/0092 264/465 |
| 2009/0162468 | A1* | 6/2009 | Barinov | D01D 5/0076 425/145 |
| 2010/0204364 | A1 | 8/2010 | Ruotsi et al. | |
| 2013/0274384 | A1 | 10/2013 | Dooley et al. | |
| 2016/0168363 | A1* | 6/2016 | Nelson | C08L 1/04 428/35.7 |
| 2017/0333602 | A1 | 11/2017 | Amiralian et al. | |

OTHER PUBLICATIONS

Written Opinion of the International Searching Authority for PCT/FI2019/050164 dated May 22, 2019.
Spence, Kelley et al, (2011), "Nanocellulose-Based Composites", In: "Cellulose Fibers: Bio- and Nano-Polymer Composites", pp. 179-213.
"Polytetrahydrofuran," https://en.wikipedia.org/w/index.php?title=Polytetrahydrofuran&oldid=922763854, last edited Oct. 24, 2019.
"Isocyanate," https://en.wikipedia.org/w/index.php?title=Isocyanate&oldid=972776739, last edited Aug. 13, 2020.
"Silanization," https://en.wikipedia.org/w/index.php?title=Silanization&oldid=960511836, last edited Jun. 3, 2020.
"Parts-per notation," https://en.wikipedia.ort/w/index.php?title=Parts-per_notation&oldid=975412759, last edited Aug. 28, 2020.
"Mass fraction (chemistry)," https://en.wikipedia.org/w/index.php?title=Mass_fraction_(chemistry)&oldid=963348977, last edited Jun. 19, 2020.
"(3-Aminopropyl)triethoxysilane," https:en.wikipedia.org/w/index.php?title=(3Aminopropyl)triethoxysilane&oldid=963634372, last edited Jun. 20, 2020.

\* cited by examiner

FIBROUS WEB MANUFACTURING ROLL WITH COVER HAVING FUNCTIONAL LAYER WITH NANOCELLULOSE MATERIAL

CROSS REFERENCES TO RELATED APPLICATIONS

This application is a US national phase of PCT/FI2019/050164 filed on Mar. 1, 2019 and claims priority on FI 20185201 filed on Mar. 1, 2018 both of which are incorporated herein by reference.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a roll and its use according to the preambles of the enclosed independent claims.

Various polymer coated rolls are used in manufacture of fibrous webs, such as webs of paper, board, tissue or the like. Rolls can be used in several parts of the manufacturing process, both in paper, board and tissue machines, as well as in converting and finishing machines, such as calenders and coating units. Non-limiting examples of various polymer coated rolls are calender rolls, coater rolls, reeling drums, press rolls and guide rolls.

Conventionally the rolls are coated with one or several polymer layers. Roll cover typically comprises a polymer matrix, where various fillers, reinforcing fibers and/or additives may be included. The mechanical properties of the roll cover are influenced by the polymer matrix itself as well as by the used fillers, reinforcing fibers and/or modifiers. The fillers, fibers and/or modifiers change the mechanical properties of the roll cover, and consequently of the roll surface.

There is a constant need to improve the mechanical properties of roll covers which are used in manufacture of fibrous webs. The desire is to find a reinforcing material or modifier that would provide the roll cover with enhanced mechanical properties and be compatible with various polymer matrices.

Nanostructured cellulose materials have been developed from the 1970's onwards. Nanostructured cellulose material can be produced in form of nanofibrillated cellulose, nanocrystalline cellulose or bacterial cellulose. In general, nanostructured cellulose materials have many advantages and interesting properties, such as strength and viscosity, which have inspired their use in various fields of technology. For example, nanofibrillated cellulose is used in food industry as a thickener and stabilizer, and in paper industry as a component in coatings. Nanostructured cellulose material has also been used as a component in various composite materials. Furthermore, as a renewable biomaterial nanostructured cellulose is attractive for sustainable industries.

SUMMARY OF THE INVENTION

An object of this invention is to minimize or even totally eliminate the disadvantages existing in the prior art.

Another object of the present invention is to provide a roll with improved mechanical properties, especially with improved tensile strength, impact strength and/or elongation.

All described features apply both for the roll as well as its use, whenever applicable, even if it not necessarily always stated so.

A typical roll according to the present invention for use in a manufacture of a fibrous web, which comprise cellulosic fibers, has a roll body with a cylindrical surface, and a roll cover, which is arranged to cover the cylindrical surface of the roll body, the cover has a functional layer, which has a polymer matrix and reinforcing material in the form of functional particles and/or functional fibers embedded in the polymer matrix, wherein the functional particles and/or functional fibers comprise nanocellulose material.

The roll according to the present invention is typically used in a paper machine, board machine, tissue machine or in a converting machine for a fibrous cellulosic web.

Now it has been surprisingly found that reinforcing material in the form of functional particles and/or fiber comprising nanocellulose material improves mechanical properties, especially tensile strength, impact strength and/or elongation, of a roll when they are incorporated in the polymer matrix of the functional layer. At the same time, other mechanical properties of the roll, such as tear strength and abrasion resistance, remain at least on a conventional level, i.e. they are not reduced by use of nanocellulose material. Furthermore, nanocellulose materials are easily compatible with different polymer matrices. It is also possible that the incorporation of nanocellulose material in the polymer matrix of the functional layer makes the processing of the layer easier, as the nanocellulose material may provide positive impact to the viscosity of the matrix.

BRIEF DESCRIPTION OF THE DRAWINGS

Some embodiments of the invention are explained more closely in the following schematical non-limiting drawings.

DESCRIPTION OF THE PREFERRED EMBODIMENTS

Figure 1:
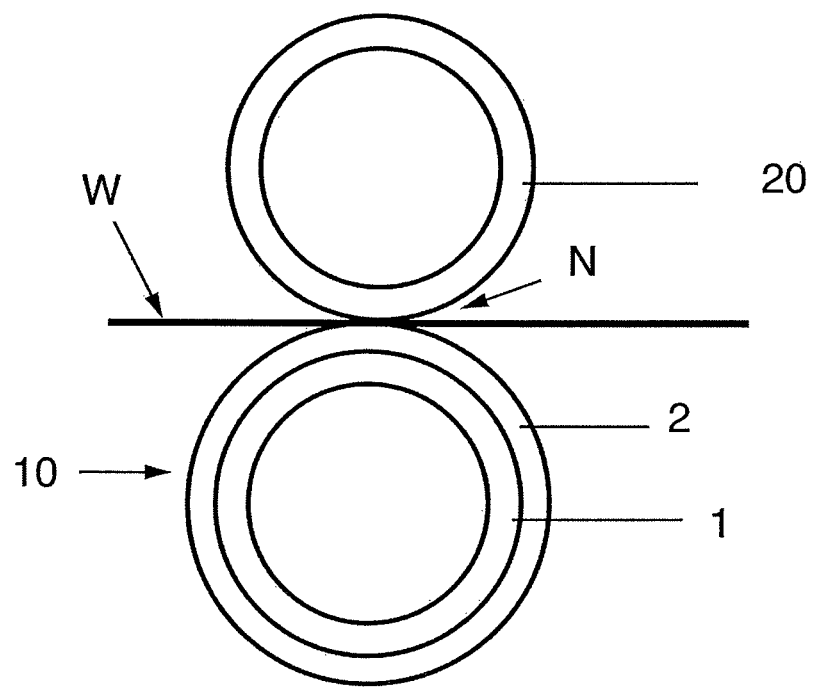
FIG. 1 shows a nip roll arrangement in a paper or board machine.

In one preferable embodiment of the invention the roll for use in a manufacture of a fibrous web of cellulosic fibers, has a roll body with a cylindrical surface, and a roll cover, which covers the cylindrical surface of the roll body. The cover has a functional layer which comprises a polymer matrix and functional particles embedded in the polymer matrix. The functional particles comprise nanocellulose material.

In the present context "nanocellulose material" is understood as particular or fibrillar cellulose material having at least one dimension, such as length and/or width and/or diameter, which is in nanosize range, i.e. <950 nm. Nanocellulose material originates from cellulose containing natural starting material. Suitable starting materials are cellulose containing wood materials, such as softwood or hardwood, or non-wood materials, such as cotton, kenaf, bamboo, bagasse, flax, hemp, jute, sisal, vegetables or fruits. Wood based starting materials are usually preferable.

The nanocellulose material may be in fibrous form or in particle form. The nanocellulose material, which is suitable for use in the present invention, may be selected from cellulose nanofibrils, nanocrystalline cellulose particles or any of their mixtures. Cellulose nanofibrils contain both crystalline and non-crystalline regions in their structure, whereas the non-crystalline regions have been mostly or completely eliminated from the structure of nanocrystalline cellulose particles. Cellulose nanofibrils and nanocrystalline cellulose particles differ from each other by their mechanical properties, e.g. rigidity. Depending on the properties, which are desired for the roll cover, it is possible to use cellulose nanofibrils, nanocrystalline cellulose or any of their mixture.

According to one embodiment the used nanocellulose material comprises cellulose nanofibrils that are obtained by mechanical treatment of cellulose containing starting material, as described above. Nanocellulose material in fibrous form, such as cellulose nanofibrils, may be obtained by mechanical treatment, which is selected from high-pressure homogenization, grinding or microfluidization. Before mechanical treatment the cellulose containing starting material may be pre-treated by refining or cryocrushing. Alternatively, or in addition, the starting material may be enzymatically or chemically pre-treated, e.g. by TEMPO-oxidation.

Nanocellulose material in fibrous form, such as cellulose nanofibrils, may have a length >4 µm. According to one preferable embodiment the nanocellulose material in fibrous form, such as cellulose nanofibrils, may have a length of ≤300 µm, preferably ≤200 µm, and a width of 5-50 nm, preferably 5-20 nm.

According to one embodiment of the invention the nanocellulose material in particle form is obtained by acid hydrolysis, and has a largest dimension, which is ≤500 nm, preferably ≤300 nm. Nanocellulose material in particle form which is obtained by acid hydrolysis is called nanocrystalline cellulose.

The reinforcing material may be in the form of a functional fiber produced from nanofibrillar cellulose, preferably by spinning or drawing. The functional fibers may be made solely of nanofibrillar cellulose, or they may be produced from nanofibrillar cellulose and any suitable polymer, such as polyvinyl alcohol, polypropylene, polyethylene, poly (lactic acid) or cellulose acetate butyrate. If the functional fibers are formed solely from nanofibrillar cellulose, various solution methods available and known as such may be used for fiber formation, such as wet spinning, dry spinning or flow focusing. If the functional fibers are formed by using both nanofibrillar cellulose and polymer, the fibers may be formed by using melt spinning or solution spinning, such as dry spinning or wet spinning.

The functional fibers may be produced from the starting material comprising nanofibrillar cellulose into continuous fibers. The produced functional fibers are not necessarily fully circular. Their diameter is the longest distance between two points on the circumference, of the fiber, which are connected by a straight line passing through the center of the cross-section of the fiber. According to one embodiment the reinforcing material, which is in the form of a fiber and produced from nanofibrillar cellulose, has a diameter >15 µm, preferably 15-350 µm, more preferably 20-300 µm.

According to one embodiment of the invention the functional layer comprises reinforcing material both in form of functional particles and functional fibers, wherein both the functional particles and functional fibers comprise nanocellulose material.

According to one embodiment of the invention the reinforcing material in the form of functional particles and/or functional fibers comprise nanocellulose material, which comprises surface-modified nanocellulose material. The nanocellulose material may be surface-modified by silanization, silylation, acetylation, esterification, glyoxalisation or by grafting of functional groups. Preferably the nanocellulose material is modified by silanization. For example, the nanocellulose material may be surface-modified by introduction of functional groups selected from amino, epoxy, thiocyanato, methacryloxy, vinylsilane and sulphide containing silane, wherein the functional groups are, for example, coupled to the surface by silanization. According to one embodiment the nanocellulose material may be amino-silanized or epoxy-silanized. Surface modification improves the interaction between the surface of the nanocellulose material and the surrounding polymer matrix of the functional layer. In this manner it is possible to improve the chemical compatibility between the nanocellulose material and the surrounding polymer matrix and consequentially the mechanical properties of the roll cover. Surface modification of nanocellulose material makes them also compatible for different polymer matrices. If the reinforcing material is in form of functional fibers, which are produced from nanofibrillar cellulose, the surface of the functional fibers may be modified after they have been formed into fibers, e.g. by spinning or drawing.

The functional layer in general comprises a polymer matrix and reinforcing material comprising nanocellulose material embedded in the said polymer matrix. The thickness of the functional layer may be 5-40 mm. The nanocellulose material may be substantially homogenously divided into the polymer matrix, i.e. functional layer. This means that the concentration of nanocellulose material, as well as the optional additional filler particles and/or additional fibers, as described later, is the same at both the inner and outer surface of the functional layer, as well as throughout the layer. Preferably all particles and fibers in the functional layer, including the nanocellulose material and optional additional filler particles, are homogenously divided in the axial and circumferential directions of the roll.

The nanocellulose material could also be used in the form of a continuous reinforcing fiber, which is possibly impregnated by the polymer material and then wound on the roll body, or in the form of a non-woven mat or as an ingredient in a non-woven fiber mat, wound around the roll body. Continuous fibers made from nanofibrillar cellulose provide ultimate strength properties per cross sectional area, and due to their small diameter, the fibers are firmly integrated with the polymer matrix, providing thus excellent smoothness to the roll cover in addition to the good strength properties.

According to one embodiment of the invention the polymer matrix of the functional layer may be made of rubber, thermosetting polymer or thermoplastic polymer. Suitable rubbers are, for example, natural rubbers, nitrile butadiene rubbers, hydrogenated nitrile butadiene rubbers, chloroprene rubbers, ethylene propylene diene (EPDM) rubbers, chlorosulphonated polyethylene (CSM) rubbers, and any of their mixtures. Suitable thermosetting polymers are, for example, various polyurethane resins and epoxy resins. Suitable thermoplastic polymers, although less used, are, for example, fluorothermoplastic polymers and polyphenylene sulphide, polyether ketone, polyether ether ketone, polyphtalamide, polyamide, polyetherimide, polyethersulphone, polysulphone and any of their mixtures.

According to one embodiment of the invention the functional layer may comprise 0.05-20 weight-%, preferably 0.1-10 weight-%, more preferably 0.5-2 weight-%, of nanocellulose material.

The polymer matrix of the functional layer may further comprise additional filler particles and/or additives. The polymer matrix may comprise additional filler particles of one type, or the polymer matrix may comprise a plurality of different additional filler particles. For example, the polymer matrix may comprise second, third and any successive additional filler particles. The additional filler particles may be selected from inorganic particles, such as particles of silica, silicon carbide, carbon black, titanium oxide, feldspar, kaolin; or from organic particles, such as particles of aramid or polyethylene or rubber. In some embodiments the additional filler particles may have an average particle diameter over 5 µm, preferably in the range of 10-300 µm. It is also possible to use nanosized additional filler particles, which have an average particle diameter <1 µm, for example 5-40 nm. Nanosized additional filler particles can be used alone or together with larger additional filler particles. Use of one or more additional filler particles make it possible to adjust the mechanical properties in each or any layer of the roll cover in a proper, flexible and cost-effective manner. However, in the present invention the use of additional filler particles is fully optional.

In case the functional layer comprises additional filler particles, the amount of nanocellulose material in the functional layer may be around 1 weight-%, for example 0.5-1.5 weight-%. The total amount of nanocellulose material and additional filler particles in the functional layer is typically ≤30 weight-%. The total weight denotes the dry weight of nanocellulose material and additional filler particles.

According to one embodiment of the invention the functional layer comprises solely nanocellulose material and is free from any other additional inorganic and/or organic filler particles, excluding possible pigment particles.

The polymer matrix of the functional layer may further comprise additional reinforcing fibers, such as glass, nylon, carbon, polyester or aramid fibers, in addition to functional particles or functional fibers comprising nanocellulose material. The functional layer may also contain two or more types of different additional reinforcing fibers.

FIG. 1 shows a nip roll arrangement in a paper or board machine. Two parallel rolls 10, 20 are located adjacent to each other and form a nip N between them. One or both rolls 10, 20 may be loadable against each other. Rolls 10, 20 may be rolls of a calender, a press, a coater or a sizer. A web W of a paper or board is running through the nip N either unsupported or supported by a belt or felt. Both rolls have a metal body or shell 1 and at least one of them has a roll cover 2, made of polymer and arranged to enclose the metal body or shell 1.

Figure 2:
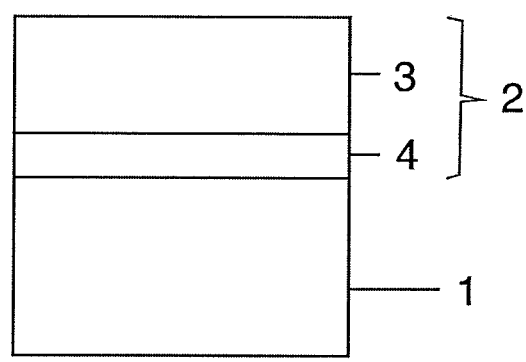
FIG. 2 shows a more detailed view of a roll and roll cover.

FIG. 2 shows a more detailed view of a roll and roll cover. The cover 2 comprises at least a functional layer 3 which is the outermost layer of the cover 2 and provides the surface of the metal body 1 of the roll. During the manufacture of paper or board the functional layer 3 is in contact either with a fibrous web or a fabric supporting the fibrous web, and thus the functional layer is exposed to wear and the stress from the environment. The functional layer 3 comprises at least nanocellulose particles, optionally also other additional filler(s) and reinforcing fibers.

Beneath the functional layer 3 there may be one or more intermediate layer(s) 4, which provide an adhering layer between the metal body 1 and the functional layer 3. The intermediate layer(s) 4 may further provide other tailored properties for the cover 2, for example in terms of grading hardness, thermal conductivity, etc. The intermediate layer(s) 4 may comprise fiber reinforcement. The one or more of the intermediate layer(s) 4 may further comprise at least one filler. The filler in the intermediate layer(s) may be the same as or different from the filler in the functional layer 3. In case of two or more intermediate layers, the filler in the individual intermediate layers may be the same or different. The amount of the filler in the intermediate layer 4 is preferably lower than the amount of the filler in the functional layer 3.

EXPERIMENTAL

Some embodiments of the invention are described in the following non-limiting examples, where cover compositions for calender rolls or sizer rolls were tested using varying filler compositions.

Examples 1-2

Two samples simulating calender roll covers without reinforcing fibers were prepared. A resin composition comprising bisphenol-F epoxy resin, diethyl toluene diamine hardener and 0.5 phr tertiary amine accelerator was made. The resin composition was the same in both Examples 1-2.

In Example 2 aminosilane-modified cellulose nanocrystals (CNC) were added by high shear mixing and ultrasonication and in the amount of 1 weight-% of the total weight of the resin composition. The used CNC was purchased from the University of Maine as a spray-dried powder and according to the product specifications it had a fiber width of 5-20 nm and a fiber length of 150-200 nm. The CNC was dispersed in the resin composition and the obtained CNC/resin dispersion was degassed prior to the mixing with the hardener.

Both resin compositions thus obtained were applied to a mold in the thickness of 12 mm. The samples were cured at a temperature of 150° C. for 8 hours. Several mechanical tests were performed to the cured samples. The wear test was performed as a rubber wheel wear test slightly modified from standard ASTM G65 giving material loss in $mm^3/Nm$. Other tests performed were hardness (measured as Shore D hardness), tensile strength, elongation at break and impact strength (measured as Charpy impact test). The measured value for the embodiment according to the invention (Example 2) is given in Table 1 as a percentage in relation to Example 1, the unfilled reference without CNC. A negative percentage value for wear indicates that the surface is less prone to wear, which is desired. Positive percentage values for elongation and impact strength indicate that the surface has better strength properties, which is desired.

Examples 3-4

Two samples simulating a sizer roll cover were prepared. A polyurethane composition was made by mixing MDI-terminated polyether prepolymer having an NCO content of 11.5%, 30 phr PTMEG polyol having an average molecular weight of 2000 g/mol and 1,4-butanediol as the main curative, stoichiometric index being 105. The polyurethane composition was the same in both Examples 3-4.

In Example 4 aminosilane-modified cellulose nanocrystals (CNC) were added by high shear mixing and ultrasonication and in amount of 1 weight-% of the total weight of the polyurethane composition. The CNC was purchased from the University of Maine as spray-dried powder and according to the product specifications had a fiber width of 5-20 nm and a fiber length of 150-200 nm. The CNC was dispersed in the PTMEG and the dispersion was degassed prior to the mixing with the prepolymer and 1,4-butanediol.

Example 3 represents a comparative example, while Example 4 represents an embodiment according to the invention. The obtained polyurethane compositions were mold-cast and post-cured at 130° C. for 18 hours. The wear test was performed according to the standard DIN 53516 giving material loss as mm³. Tear strength was measured according to the standard ISO 34-1, method B, procedure (b). The measured value for the comparative test (Example 3) is given as an absolute value in Table 1 while the values for the Example 4 according to the invention are given as a percentage in relation to Comparative Example 3. A negative percentage value for wear indicates that the surface is more resistant to wear, which is desired. A positive value for tensile strength, elongation at break and tear strength indicate the material is mechanically stronger, which is desired.

It can be seen from results in Table 1 that improvements, may be obtained by roll cover compositions comprising modified cellulose nanocrystals. Especially, impact strength value in epoxy and mechanical strength values in polyurethane showed good and unexpected improvement.

When testing dynamic behavior in terms of tan-delta as a function of temperature it was found that a polyurethane roll cover according to the invention and comprising modified cellulose nanocrystals behaved very similarly, almost identically to the unfilled roll cover. Based on all the tests performed it can be concluded that all the basic properties of a roll cover were improved without compromises, which is rarely achieved by a single raw material alone Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

TABLE 1

Results of examples 1-4.

| Property | Example 1 (C) | Example 2 | Example 3 (C) | Example 4 |
|---|---|---|---|---|
| Hardness, [ShD] | 87 | 87 | — | — |
| Modulus E' at 30° C., [MPa] | 2780 | −7% | 18.2 | +3% |
| Tensile strength, [MPa] | 8.9 | −1% | 18.5 | +32% |
| Elongation at break, [%] | 5.1 | +10% | 343 | +37% |
| Tear strength, [N/mm] | — | — | 30.4 | +7% |
| Charpy impact strength [kJ/m²] | 22.4 | +45% | — | — |
| DIN 53516 wear, [mm³] | — | — | 54 | −5% |
| Rubber wheel wear rate, [mm³/Nm] | 0.0140 | −14% | — | — |

(C) = comparative example, without CNC

The invention claimed is:

1. A fibrous web production roll for manufacturing a cellulosic fibrous web comprising:
    a roll metal body with a cylindrical surface;
    a roll cover of an epoxy matrix material on the cylindrical surface of and covering the roll metal body;
    wherein the roll cover matrix material epoxy is reinforced with embedded nanocellulose material of 0.5-2 percent by weight and wherein the nanocellulose material is surface-modified for chemical compatibility with the epoxy matrix material and wherein the nanocellulose material is in the form of at least one of functional particles and functional fibers.

2. The roll of claim 1 wherein the nanocellulose material comprises at least one of: cellulose nanofibrils and nanocrystalline cellulose particles.

3. The roll of claim 1 wherein the nanocellulose material has fibers having a length and a width, at least one of which is less than 950 nm.

4. The roll of claim 3 wherein the nanocellulose material is cellulose nanofibrils in fibrous form having a length less than 300 μm and a width of 5-50 nm.

5. The roll of claim 1 wherein the nanocellulose material is in particle form, is obtained by acid hydrolysis, and has a largest dimension which is less than 500 nm.

6. The roll of claim 1 wherein the nanocellulose material is a spun fiber produced from nanofibrillar cellulose.

7. The roll of claim 6 wherein the nanocellulose material is a fiber of nanofibrillar cellulose and a polymer.

8. The roll of claim 1 wherein the nanocellulose material is functional fibers of nanofibrillar cellulose which have a diameter >15 μm.

9. The roll of claim 8 wherein the functional fibers are continuous fibers.

10. The roll of claim 1 wherein the at least one of functional fibers and functional particles are surface-modified for chemical compatibility by silanization, silylation, acetylation, esterification, glyoxalisation or by grafting of functional groups.

11. The roll of claim 10 wherein the at least one of functional fibers and functional particles comprising nanocellulose material is surface-modified by introduction of functional groups selected from the group comprising: amino, epoxy, thiocyanato, methacryloxy, vinylsilane or sulphide containing silane.

12. The roll of claim 1 wherein the total amount of nanocellulose material and any additional filler particles or additives in the functional layer is less than 30 weight percent.

13. The roll of claim 12 wherein the polymer matrix functional layer further comprises reinforcing fibers selected from the group consisting of glass, nylon, carbon, polyester and aramid fibers.

14. The roll of claim 1 further comprising at least one intermediate layer between the roll cover of the epoxy matrix material and the metal roll.

15. A fibrous web production roll for manufacturing a cellulosic fibrous web comprising:
    a roll metal body with a cylindrical surface;
    a roll cover of a polyurethane matrix material on the cylindrical surface of and covering the roll metal body; and
    wherein the roll cover polyurethane matrix material is reinforced with embedded nanocellulose material of 0.5-2 percent by weight and wherein the nanocellulose material is surface-modified for chemical compatibility with the polyurethane matrix material and wherein the nanocellulose material is in the form of at least one of functional particles and functional fibers.

16. The roll of claim 15 wherein the nanocellulose material comprises at least one of: cellulose nanofibrils and nanocrystalline cellulose particles.

17. The roll of claim 16 wherein the nanocellulose material is cellulose nanofibrils in fibrous form having a length less than 300 μm and a width of 5-50 nm.

18. The roll of claim 15 wherein the nanocellulose material is a spun fiber produced from nanofibrillar cellulose.

19. The roll of claim 15 further comprising at least one intermediate layer between the roll cover of the polyurethane matrix material and the metal roll.

* * * * *